United States Patent Office 3,590,040
Patented June 29, 1971

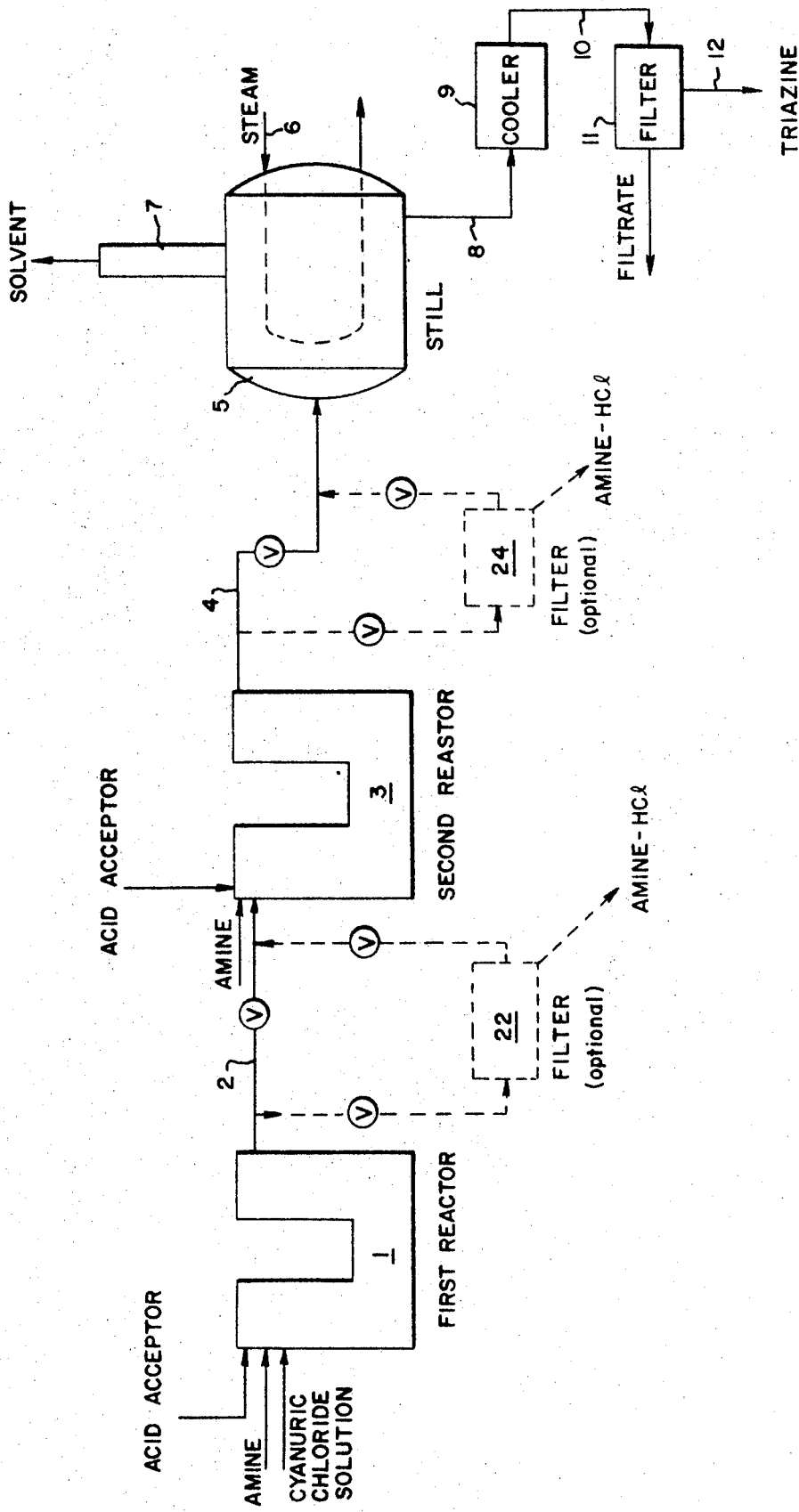

3,590,040
PROCESS FOR CONTINUOUS PREPARATION OF AMINO-CHLORO-S-TRIAZINES
John F. Ferguson, Ardsley, N.Y., and Philip G. McCracken, Baton Rouge, La., assignors to Ciba-Geigy Corporation, Greenburgh, N.Y.
Continuation-in-part of application Ser. No. 513,181, Dec. 13, 1965. This application Aug. 6, 1969, Ser. No. 850,320
Int. Cl. C07d 55/48
U.S. Cl. 260—249.5
11 Claims

ABSTRACT OF THE DISCLOSURE

A continuous process for producing first an intermediate 2,4-dichloro-6-lower alkylamino-s-triazine and then therefrom a 2-chloro-4,6-bis lower alkylamino-s-triazine herbicide. A first reaction mixture is established and maintained in which cyanuric chloride in organic solvent solution is reacted in a substantially non-aqueous medium with a lower alkylamine to form a 2,4-dichloro-6-lower alkylamino-s-triazine and hydrochloric acid. An organic solvent solution of cyanuric chloride, an amine to be reacted therewith, and an acid acceptor are continuously and simultaneously added to the first reaction mixture. An organic solvent solution of a 2,4-dichloro-6-lower alkylamino-s-triazine is continuously withdrawn from the first reaction mixture and continuously added with a lower alkylamine and an acid acceptor to a second reaction mixture. A solvent solution of a 2-chloro-4,6-bis-lower alkylamino-s-triazine is continuously withdrawn from the second reaction mixture and the latter diamino compound is recovered from its solution. The amount of reactants used is equivalent to about one mole of cyanuric chloride, one mole of amine and about one mole of acid acceptor in the first reaction mixture for each mole of dichloro product being withdrawn from said first reaction mixture, and about one mole of the dichloro product, about one mole of amine and about one mole of acid acceptor are added to the second reaction mixture for each mole of diamino reaction product being withdrawn from the second reaction mixture. The temperature in the first reaction mixture ranges from about −10 to 60° C. and the temperature of the second reaction mixture ranges from about 20 to 90° C. The pH is about 9–12.

CROSS-REFERENCE TO RELATED APPLICATION

This application is a continuation-in-part of our pending application Ser. No. 513,181, filed Dec. 13, 1965, now abandoned.

FIELD OF THE INVENTION

This invention relates to a continuous process for the economical production of 2,4-dichloro - 6 - lower alkylamino-s-triazines and more particularly, to an improved continuous process for the economical production, via the above 2,4-dichloro-6-lower alkylamino-s-triazines (hereinafter called "dichloro" compounds or product) of 2-chloro - 4,6 - di-lower alkylamino-s-triazines (hereinafter called "diamino" compounds or products).

The term "lower alkyl" as used herein means saturated monovalent aliphatic radicals of the formula $-C_nH_{2n+1}$ wherein $n$ designates an integer of less than five and is inclusive of such groups as methyl, ethyl, n-propyl, isopropyl, n-butyl, isobutyl, sec.-butyl and tert.-butyl. Details with respect to such compounds are set forth specifically in U.S. Pat. No. 2,891,855.

Diamino compounds of this formula inhibit the growth of plants and are widely used as herbicides. Especially valuable herbicides are atrazine (2-chloro-4-ethylamino-6-isopropylamino-s-triazines), simazine (2 - chloro - 4,6-bis - ethylamino - s - triazine), 2-chloro-4,6-bis-isopropylamino-s-triazine ("Propazine"), 2-chloro-4-ethylamino-6-tert.-butylamino-s-triazine, etc., which are employed both as selective herbicides for weed control among cultivated plants and as soil sterilants for the total elimination of undesired plant growth.

BACKGROUND OF THE INVENTION

These diamino compounds have, in known commercial productions, heretofore been prepared by a batch process in which finely divided solid cyanuric chloride is first placed in suspension in an aqueous medium either by preparing an aqueous slurry of the finely divided cyanuric chloride by grinding and then suspending the finely ground cyanuric chloride in water, or by dissolving cyanuric chloride in acetone and then precipitating it in finely divided form by pouring this solution into a relatively large quantity of ice water. (See, e.g., U.S. Pat. No. 2,891,855). Then an equivalent amount of a lower alkyl amine is added in the presence of an alkaline substance at a temperature of 0–5° C. to obtain the dichloro compound. This is then reacted with an equivalent amount of the same or a different lower alkyl amine and an alkaline substance, at temperatures up to 50° C.

This and other prior art batch processes do not easily lend themselves to being carried out on a continuous basis, because for best results, they involve essentially five separate steps. To make the dichloro compound takes three steps, namely (1) preparation of the suspension, (2) substitution of the first chlorine of the solid cyanuric chloride forming the suspension by an amino group, and (3) removal of the hydrochloric acid formed by means of an alkaline substance acting as an acid acceptor. Thereafter, to complete preparation of the diamino compound, two further separate steps are performed, namely (4) substitution of the second chlorine of the cyanuric chloride by the same or a different amino group and (5) again removal of the HCl then formed by means of an alkaline substance. As pointed out above, solid cyanuric chloride has been placed in suspension in an aqueous medium. This has mainly been because cyanuric chloride, after its preparation by trimerization of cyanogen chloride in the vapor phase, has undergone a desublimation treatment in order to recover it in a form in which it can be moved on to the process for producing the diamino compound. The solid cyanuric chloride product is in practice placed in containers and stored temporarily. It must, of course, be handled by the operators when it is containerized, when it is stored and when it is moved to the process for producing the diamino compound. These are undersirable operations requiring considerable time and great care to avoid injury of personnel because of the corrosive and highly toxic nature of cyanuric chloride. In these batch-type triazine producing processes, it is also requisite to maintain very low temperatures. These have been achieved by the use of large quantities of ice for at least the first substitution reaction. Further, in these processes because the cyanuric chloride is present at full concentration in the aqueous suspension, all during the time the amine and acid acceptor are being added during the first substitution reaction, significant amounts of side-products are obtained, reducing the yield of the desired triazines. Moreover, due to the heterogeneity of the reaction mass (solid-liquid slurry), the reactions proceed at a relatively slow rate and for this reason as well as for the fact that three steps are involved in the first substitution reaction, undesirably long times are required for this reaction to be completed.

There has been reported in the literature several processes for producing triazines by carrying out the substitution reactions in a solution of cyanuric chloride in an inert non-aqueous solvent. See for example Knusli et al. U.S. Pat. No. 3,244,712, Koopman dissertation, University of Groninger, 1957 and Mueller et al. Czechoslovakian Pat. No. 110,352. However, even these processes are batch processes, and they require, when the cyanuric chloride starting material is in finely divided solid form, a dissolving step in lieu of the step of preparing a suspension. Otherwise the steps are identical and have essentially the same disadvantages as the batch process in which a suspension is used.

A conversion of any of the above-described batch processes to a continuous process would require, for example, the following steps:

(1) Preparing the aqueous suspension or the non-aqueous solution of cyanuric chloride in a first reactor at a very low temperature, i.e., about 0° to 5° C., (2) Flowing the thus prepared cyanuric chloride reaction medium to a second reactor in which the first alkylamine is added, (3) Adding the acid acceptor in a third reactor accompanied by agitation to bring about completion of the first substitution reaction, that is, conversion to the dichloro product at a very low temperature, i.e., about 0°–5° C., (4) Feeding the dichloro product thus obtained to a fourth reactor in which the second alkylamine is added, (5) Passing the reaction mixture to a fifth reactor where an acid acceptor is again added and, while accompanied by agitation, effecting the second substitution, that is, converting the dichloro intermediate to the desired diamino product, followed by (6) Passing the reaction mass to a filtration tank to isolate the desired diamino final product.

Such a procedure would not basically change the process but would merely enable materials to be handled more expeditiously. Such a complicated procedure would not overcome the serious disadvantages of the prior art procedures, namely the necessity to maintain very low temperatures and the losses of the desired diamino product due to the formation of side products.

SUMMARY OF THE INVENTION

We have now found that unless great care is exercised to control temperatures and pH accurately, good yields of the desired end products are not obtained in prior art batch processes. The pH, time and temperature must be carefully regulated to avoid excessive hydrolysis of the cyanuric chloride. This has been extended to make possible the carrying out of the reactions of the process for producing triazines in a continuous manner.

The present invention relates to a continuous process for preparing a dichloro compound by establishing and maintaining a reaction mixture in which cyanuric chloride in organic solvent solution is practically instantaneously reacted in a substantially non-aqueous medium with a lower alkylamine to form a 2,4-dichloro-6-lower alkylamino-s-triazine and hydrochloric acid; continuously and simultaneously adding to the reaction mixture an organic solvent solution of cyanuric chloride, the amine to be reacted therewith and an acid acceptor, and continuously withdrawing from the reaction mixture at a point remote from the addition point, an organic solvent solution of a 2,4-dichloro-6-lower alkylamine-s-triazine, the amount of reactants used being equivalent to about one mole of cyanuric chloride with about one mole of amine and about one mole of acid acceptor in the mixture being added to the reaction mixture for each mole of dichloro product being withdrawn from said reaction mixture and maintaining the temperature in the reaction mixture in the range from about —10° to 60° C. and maintaining the pH in the range from about 9–12.

The instant invention further relates to a continuous process for preparing a diamino compound from the dichloro intermediate by establishing and maintaining a second reaction mixture in which said 2,4-dichloro-6-lower alkylamino-s-triazine is reacted in a solvent medium with the same or a different lower alkylamine to form a 2-chloro-4,6-bis-lower alkylamino-s-triazine and hydrochloric acid, and continuously and simultaneously adding the withdrawn dichloro compound solution together with the same or a different lower alkylamine and an acid acceptor to the second reaction mixture and continuously withdrawing a solution of a 2-chloro-4,6-bis-lower alkylamino-s-triazine from the second reaction mixture and recovering the latter diamino compound from its solution, the amount of reactants being added to the second reaction mixture being equivalent to about one mole of said dichloro compound with about one mole of said amine and about one mole of acid acceptor for each mole of diamino compound being withdrawn from the second mixture.

DETAILED DESCRIPTION OF THE INVENTION

A solution of cyanuric chloride in a substantially non-aqueous medium consisting essentially of an inert organic solvent, is used as one reactant material. This can be prepared from solid cyanuric chloride. However, recently developed processes for the production of cyanuric chloride produce such a solution directly from an absorption system of a cyanuric chloride production unit using the solvent as the absorbent. Thus by using this solution as one reactant material, the desublimation and handling of the solid cyanuric chloride is avoided. The first chlorine substitution is accomplished by simultaneously feeding this cyanuric chloride solution, the desired lower alkyl amine and an acid acceptor to a single stirred reaction vessel having a reaction mixture of already reacted cyanuric chloride and amine therein to replace one chlorine atom of cyanuric chloride with the amine. The temperature of this reaction vessel can be maintained (e.g., in the range of about —10° to 60° C.) by circulating the reaction mixture through an external heat regulator.

The second chlorine substitution is carried out, preferably in a second reaction vessel, by adding an acid acceptor and the same or a different amine to the organic solvent solution of the dichloro product. This particular step can be carried out in a substantially non-aqueous medium or in a water-containing inert organic solvent. The temperature can be maintained (e.g., in the range of about 20° to 90° C.) by another external heat exchanger. After completion of the reaction, the solvent is stripped off. The wet cake is then dried to give the final technical diamino product.

Practice of the process of the present invention using an inert organic solvent solution of the cyanuric chloride has many and significant advantages in contrast to the prior art processes described above. In addition to the fact that the cyanuric chloride solution for the first substitution reaction can be taken directly from a cyanuric chloride production unit, the temperature in the first substitution reaction step need not be maintained at the 0°–5° C. level of the prior art procedures and large quantities of ice are therefore not needed. Further, since the reaction mixture is in the form of a solution rather than a slurry, it possesses better heat exchange properties and permits more rapid reactions to take place. Still further, substantially all of the cyanuric chloride and the amine react almost instantaneously upon introduction into the reaction medium in the vessel and one of the advantages of this almost instantaneous reaction is that the process can be carried out in considerably smaller reactors and therefore require very short contact times. This will result not only in higher yields and greater purity, but in addition, fewer losses due to formation of side products.

There are several reasons for these improvements. First, where an inorganic alkali such as an alkali metal hydroxide is used as an acid acceptor, there will be a tendency to hydrolyze the cyanuric chloride. The amount of hydrolysis is governed by the pH, temperature and the time the cyanuric chloride is present in the reaction zone. Because substantially all of the cyanuric chloride is instantaneously reacted with the amine upon introduction to the reaction mixture, the time it is present in the reaction medium is practically zero. Secondly, the unreacted free cyanuric chloride in the reaction medium is small so that there is little available for hydrolysis. Because the first substitution reaction of the instant process can be carried out rapidly and since only small amounts of unreacted cyanuric chloride are present in the reaction medium, hydrolysis losses are not a factor at processing temperatures from 25° to 60° C. even in the presence of water introduced with the acid acceptor.

For optimum yield and purity of product it is important to carry out the present process at a pH of about 9 to 12. At lower pH conditions, e.g. 7 to 8, substantial quantities of the lower alkylamine are, when added to cyanuric chloride, converted to lower alkyl ammonium ions which, in the diamino product step, bring about the formation of undesirable bis products. At higher pH conditions, e.g. 12 and above, these ammonium ions are reduced to insignificant amounts.

The temperatures used in the two reaction mixtures may vary considerably without affecting the reactions. Generally the temperature in the first chlorine substitution is somewhat lower than that of the second chlorine substitution but may be the same in both. Temperatures from −10° to that approaching but not reaching the boiling point of the solvents can be used depending somewhat on the degree of solubility of the reactants and products in the solvents as well as the relative rates of reactions desired. Illustrative ranges are about −10° to about 60° C. and suitably about 5° to about 15° C. for the first reaction and about 20° to about 90° C. and suitably about 55° to about 70° C. for the second reaction. Higher temperatures could be used with a pressure reaction system.

The solvent for the cyanuric chloride used in the present process can be selected from organic substances which are inert with respect to the reactions involved and which are readily made anhydrous. Typical solvents include monochlorobenzene, carbon tetrachloride, methyl ethyl ketone, toluene, benzene, and the like. Carbon tetrachloride is especially effective as an absorbent for gaseous cyanuric chloride. With some of the other solvents which may not be so effective as absorbents, the absorbed cyanuric chloride may be directly transferred from an absorbent solvent to the other solvent. The amounts of cyanuric chloride which may be dissolved in the solvent will obviously vary with the nature of the solvent, the temperature of solution, and the like, but these factors do not adversely affect the basic operation of the present process. The choice of the particular solvent may depend somewhat on its boiling point, inertness at various pH, degree of solubility of reactants, and the like, all of which characteristics permit carrying out the reactions under many varying conditions.

The acid acceptor used in the reactions may be the amine used for the chlorine substitution, in excess, or a secondary amine, a tertiary amine, or an inorganic alkali, e.g., an alkali hydroxide or alkali metal hydroxide, and the like. The inorganic alkali is used with the minimum amount of water required to dissolve the inorganic chloride formed. Of course, as will be obvious, the second or tertiary amine should not be one which will react with the cyanuric chloride or the monosubstituted triazine to a significant degree. Generally, the amount of acid acceptor is about that required theoretically although, with the alkali hydroxides, a very slight excess is sometimes desirable for best results. Even though the use of aqueous alkalis introduces a small amount of water into the reaction, the amount is minimal and does not have any substantial effect on the reactions. It may, in fact, be desirable to add some water to dissolve the inorganic salt which is formed. The alkali metal chlorides or the amine hydrochlorides formed by the acid acceptors in both substitution reactions can be removed continuously or, in some cases, can be left until the final diamino product is recovered.

According to the process of this invention, the same lower alkyl amine may be used in each of the two reactions to produce a bis-amino product. Where two different amines are used to prepare a mixed amino product, the order of amine reaction is ordinarily relatively immaterial so long as adequate solvent is present and the conditions of operation are otherwise substantially the same. Properties of the dichloro compound, such as solubility, may be more important than the relative reactivity of the reactant amines. The amine hydrochloride formed in the first chlorine substitution reaction, when an amine is used as the acid acceptor, is preferably removed before subjecting the reaction product to the second chlorine substitution, particularly where different amines are used in the two substitution steps. When the second amine is a stronger acid acceptor than the first, it appears that the relative purity of the end product may be adversely affected if the first amine hydrochloride is permitted to remain in the solution for the second substitution. When the same amine is used in each step for chlorine substitution, the presence of the amine hydrochloride is not objectionable.

The accompanying drawing is a diagrammatic flowsheet illustrating, in general, a continuous process for preparing 2-chloro-4,6-di-lower alkylamino-s-triazines in accordance with the present invention. In the drawing, first reactor 1 is provided with a stirrer (not shown), suitable inlets for reactants, and is connected by a conduit 2 to second reactor 3 which is also provided with a stirrer (not shown), suitable inlets for additional reactants, and is connected by a suitable conduit 4 to still 5. Still 5 is provided with steam coil 6, a solvent vapor outlet 7 and is connected by a conduit 8 to cooler 9 which is connected by conduit 10 to filter 11. Filter 11 is provided with outlet 12 for solid diamino triazine. Filters 22 and 24 may be provided, connected to conduits 2 and 4, respectively, for removing solids (e.g., amine hydrochloride), when present, from the liquids flowing through said conduits. Suitable valves are provided for controlling the by-pass operations when filters 22 and 24 are being used.

The following examples are given as illustrative of the invention which is not limited to the specific details set forth. Parts and percentages throughout are by weight and temperatures are centigrade.

EXAMPLE 1

A reaction mixture is prepared by charging a suitable, stirred reaction vessel with a solution of cyanuric chloride (about 4%) in anhydrous carbon tetrachloride, and isopropylamine is then added in an amount equivalent to 2 moles of amine for each mole of cyanuric chloride present, with continuous agitation of the reaction mixture which is maintained at a temperature of about 50° by circulation through a heat exchanger. When the reaction vessel is full of this reaction mixture, more isopropylamine and solution of cyanuric chloride in carbon tetrachloride are continuously and simultaneously added in the same ratios as before, and, at a point distant from the inlet, products of the reaction, i.e. the reaction mixture, are removed at the same rate as the additions. Such removed products comprise a solution of 2,4-dichloro-6-isopropylamino-s-triazine in carbon tetrachloride with suspended isopropylamine hydrochloride. The hydrochloride is preferably removed by centrifugation or filtration and the clear solution is then fed continuously to another similar reaction vessel together with ethylamine in an amount equivalent to 2 moles of the ethylamine for each mole of the dichloro product. The second reaction vessel is stirred and maintained at a reaction temperature of about 50°, by circulation of the mixture through a heat exchanger as with the first reactor. The effluent from the second reactor is a carbon tetrachloride solution of atrazine (2-chloro-4-ethylamino-6-isopropylamino-s-triazine) together with suspended ethylamine hydrochloride. The latter is preferably removed from the solution as before and the atrazine is recovered from its solution by distilling off the solvent.

By the process described, the yield of dichloro product is 96–99% based on the cyanuric chloride used and the pure atrazine yield is above 95% on the same basis. Yield of active herbicidal product, that is, Atrazine plus Simazine and Propazine is 98–99%.

Equally good results are obtained when other suitable substantially anhydrous solvents are used in place of the carbon tetrachloride of this example.

Similarly, the temperatures of the reactions may be varied widely. Thus, the first chlorine substitution may be carried out at from about $-10°$ to a temperature approaching the boiling point of the solvent used, preferably up to about 60°. The second chlorine substitution is best carried out at temperatures from about 20° to a point just under the boiling temperature of the solvent used, preferably up to about 90°.

Instead of distilling off the solvent, as described, the atrazine solution may be subjected to steam stripping to remove the solvent, thereby leaving an aqueous atrazine slurry for filtration and drying. The amines may be recovered by dissolving the separated amine hydrochlorides in aqueous caustic followed by distillation and condensation of the amines.

EXAMPLE 2

The first reaction of the process is carried out as in Example 1 to produce the clear solution of 2,4-dichloro-6-isopropylamino-s-triazine which is then fed to the second reaction vessel with one mole ethylamine and one mole of 50% aqueous NaOH per mole of the dichloro product. The reactions proceed as described in Example 1 with an effluent of a carbon tetrachloride solution of atrazine together with aqueous NaCl instead of amine hydrochloride. The mixed phase solutions are subjected to steam stripping to remove and recover the solvent, and the aqueous atrazine slurry is filtered to recover the atrazine from the NaCl solution. In this process, as in Example 1, yields are substantially quantitative since an anhydrous system is used for first substitution reaction in which the yield losses occur most readily. This modification also simplifies the process by eliminating a filtration step since amine hydrochloride is not formed in the second reaction.

EXAMPLE 3

A reaction mixture is prepared by charging a suitable, stirred reaction vessel to the desired operating volume with a 20% solution of cyanuric chloride in monochlorobenzene. Isopropyl amine (2 moles per mole of cyanuric chloride) is fed simultaneously to the vessel while the contents are maintained at about 10° by circulation through an external heat exchanger. When substantially all of the cyanuric chloride has been converted to 2,4-dichloro-6-ispropylamino-s-triazine, cyanuric chloride in 20% solution in monochlorobenzene and isopropyl amine are fed simultaneously and continuously into the vessel in a ratio of one mole to two moles, respectively, while maintaining the reaction mixture at about 10°, as described. At the same time, at a point removed from the mixture inlet, the products of the reaction are removed at the same volume rate as the additions. Such removed products are monochlorobenzene solution of 2,4-dichloro-6-isopropylamino-s-triazine and precipitated amine hydrochloride. Care is taken to ensure the presence of sufficient monochlorobenzene throughout to keep the cyanuric chloride and dichloro products in solution. The products withdrawn from this reaction vessel are fed to a filter where the amine hydrochloride is removed and the filtrate is then fed continuously to a second reaction vessel together with one mole ethylamine and one mole of 50% aqueous NaOH per mole of the dichloro product. The reactions proceeds as described in Example 2 and the atrazine formed is recovered as described in that example. While the yields of atrazine may be slightly lower than those obtained in Example 1, the instant process has great commercial attractiveness because it requires fewer steps, in terms of filtrations, amine recoveries and at the same time permits greater solvent recoveries. The amount of water introduced with the caustic is relatively minor.

EXAMPLE 4

A 10.4% solution of cyanuric chloride in toluene is added to a reactor; the flow of cyanuric chloride is 73.3 lb./hr. Simultaneously, a stoichiometric flow of isopropylamine is metered into the reactor concurrently with a stoichiometrically equivalent amount of sodium hydroxide. The pH of the reaction is 11.6; the temperature is 21° C. The dichloro product of this first reaction goes continuously to a second reactor where a second molecule of isopropyl amine is attached to a cyanuric chloride molecule in a manner similar to the first addition. The flow rate of Propazine from the second reactor is 89.0 lb./hr. The pH in the second reactor is 12.0 and the temperature is 70° C. The pH is adjusted by appropriate excess of acid acceptor. The analysis of the product stream shows that 97.4% of the cyanuric chloride has been converted to the desired end product, Propazine. The dry product distribution is 99.7% Propazine.

EXAMPLE 5

A 10.6% solution of cyanuric chloride in toluene is adde, at a rate of 49.4 lb./hr. cyanuric chloride, to a reactor. Simultaneously added to the reactor are sodium hydroxide and monoethylamine. These chemicals flow in a stoichiometric rate such that there is one molecule of sodium hydroxide and one molecule of monoethylamine for each molecule of cyanuric chloride. This reaction is at a pH of 11.7 and a temperature of 28° C. The effluent of the first reactor enters a second reactor where the same flow rates of monoethylamine and sodium hydroxide are maintained. The pH in the second reactor is 12.3 and the temperature is 72° C. The pH is controlled in each reactor by adding slightly excessive amounts of the acid binder. The desired product of the second reaction is simazine and its flow rate is 52.4 lb./hr. The theoretical conversion of cyanuric chloride to simazine is 97.4%. The dry product distribution is 99.5% simazine.

EXAMPLES 6–12

A number of laboratory experiments were carried out to prepare 2,4-dichloro-6-isopropylamino-s-triazine, at different temperatures but otherwise all utilizing a feed rate of 2 g.-moles cyanuric chloride/hour, a concentration of 10% of cyanuric chloride in toluene and a reactor volume of 1 liter. The analysis of the product in percent by weight at these different temperatures of the desired dichloro compound was as follows:

| Temp. °C.: | Dichloro compound | Propazine | Cyanuric chloride |
|---|---|---|---|
| 8 | 97.4 | 1.0 | 1.6 |
| 24 | 96.8 | 1.1 | 1.2 |
| 30 | 97.5 | 1.0 | 1.4 |
| 38 | 97.2 | 1.0 | 1.8 |
| 41 | 96.7 | 2.2 | 1.1 |
| 57 | 96.2 | 2.8 | 1.0 |
| 60 | 96.5 | 1.8 | 1.8 |

The dichloro compound is approximately 100% convertible in the triazine reactor. Unreacted cyanuric chloride is converted to simazine or is hydrolyzed in the triazine reactor. The total yield of active herbicidal product in the atrazine reaction is the sum of atrazine, Propazine and simazine.

What is claimed is:

1. In a process for preparing a 2-chloro-4,6-bis-lower alkylamino-s-triazine by first reacting cyanuric chloride with a lower alkylamine to form a 2,4-dichloro-6-lower alkylamine-s-triazine and then reacting said 2,4-dichloro-6-lower alkylamino-s-triazine with the same or a different lower alkylamine, the improvement comprising establishing a first substantially non-aqueous reaction medium of cyanuric chloride and a lower alkylamine in an organic solvent solution and having a pH of about 9–12, continuously and simultaneously adding to the first reaction medium (1) an organic solvent solution of cyanuric chloride, (2) the amine to be reacted therewith, and (3) an acid acceptor, and continuously withdrawing from the first reaction mixture at a point remote from the addition point an organic solvent solution of a 2,4-dichloro-6-lower alkylamino-s-triazine, the amount of reactants added to the first reaction medium being equivalent to about one mole of cyanuric chloride and about one mole of amine for each mole of dichloro compound being withdrawn from said first reaction medium, said reactants being added in order to replace reactants which have been consumed in the reaction, and the acid acceptor being an inorganic alkali acid acceptor in an amount slightly in excess of one mole for each mole of dichloro compound being withdrawn from said first reaction medium in order to maintain the pH of said first reaction medium, maintaining the temperature of the first reaction medium from about −10° C. to 60° C., and establishing a second reaction medium of 2,4-dichloro-6-lower alkylamino-s-triazine in said organic solvent of said first reaction medium and having a pH of from 9–12, continuously and simultaneously adding to the second reaction medium (1) the dichloro compound solution withdrawn from said first reaction medium, (2) the same or a different lower alkylamine, and (3) an acid acceptor, continuously withdrawing from the second reaction medium a solvent solution of a 2-chloro-4,6-bis-lower alkylamino-s-triazine and recovering the latter diamino compound from its solution, the amount of reactants added to the second recation medium being equivalent to about one mole of said dichloro compound and about one mole of said amine for each mole of diamino compound being withdrawn from said second reaction medium, said reactants being added in order to replace reactants which have been consumed in the reaction, and the acid acceptor being an inorganic alkali acid acceptor in an amount slightly in excess of one mole for each mole of the diamino compound being withdrawn from said second reaction medium in order to maintain the pH of said second reaction medium, and maintaining the temperature of the second reaction medium from about 20° C. to about 90° C.

2. A continuous process according to claim 1 wherein the temperature of the first reaction medium is maintained between about 5° and 15° C.

3. A continuous process according to claim 1 wherein the temperature of the second reaction medium is maintained between about 55° and 70° C.

4. A continuous process according to claim 1 in which the inorganic alkali acid acceptor is sodium hydroxide.

5. A continuous process according to claim 1 wherein the second reaction medium is substantially non-aqueous.

6. A continuous process according to claim 1 wherein the second reaction medium comprises an inert organic solvent and water.

7. A continuous process according to claim 1 wherein the lower alkylamine added to the first reaction medium is isopropylamine which is reacted with cyanuric chloride to form 2,4-dichloro-6-isopropylamino-s-triazine, and wherein the lower alkylamine added to the second reaction medium is ethylamine which is reacted with the dichloro compound to form 2-chloro-4-ethylamino-6-isopropylamino-s-triazine.

8. A continuous process according to claim 1 wherein the lower alkylamine added to the first reaction medium is isopropylamine which is reacted with cyanuric chloride to form 2,4-dichloro-6-isopropylamino-s-triazine, and wherein the lower alkylamine added to the second reaction medium is isopropylamine which is reacted with the dichloro compound to form 2-chloro-4,6-bis-isopropylamino-s-triazine.

9. A continuous process according to claim 1 wherein the lower alkylamine added to the first reaction medium is ethylamine which is reacted with cyanuric chloride to form 2,4-dichloro-6-ethylamino-s-triazine, and wherein the lower alkylamine added to the second reaction medium is ethylamine which is reacted with the dichloro compound to form 2-chloro-4,6-bis-ethylamino-s-triazine.

10. In a process for preparing a 2,4-dichloro-6-lower alkylamino-s-triazine by reacting cyanuric chloride with a lower alkylamine, the improvement comprising establishing a substantially non-aqueous reaction medium of cyanuric chloride and a lower alkylamine in an organic solvent solution and having a pH of about 9–12, continuously and simultaneously adding to the reaction medium (1) an organic solvent solution of cyanuric chloride, (2) the amine to be reacted therewith, and (3) an acid acceptor, and continuously withdrawing from the first reaction mixture at a point remote from the addition point an organic solvent solution of a 2,4-dichloro-6-lower alkylamino-s-triazine, the amount of reactants added to the reaction medium being equivalent to about one mole of cyanuric chloride and about one mole of amine for each mole of dichloro compound being withdrawn from said first reaction medium, said reactants being added in order to replace reactants which have been consumed in the reaction, and the acid acceptor being an inorganic alkali acid acceptor in an amount slightly in excess of one mole for each mole of dichloro compound being withdrawn from said first reaction medium in order to maintain the pH of said first reaction medium, and maintaining the temperature of the reaction medium from about −10° C. to 60° C.

11. In a process for preparing a 2-chloro-4,6-bis-lower alkylamino-s-triazine by reacting 2,4-dichloro-6-lower alkylamino-s-triazine with a lower alkylamine, the improvement comprising establishing a reaction medium of 2,4-dichloro-6-lower alkylamino-s-triazine in an organic solvent and having a pH of from 9–12, continuously and simultaneously adding to the reaction medium (1) a solution of the dichloro compound in said organic solvent, (2) a lower alkylamine, and (3) an acid acceptor, continuously withdrawing from the reaction medium a solvent solution of a 2-chloro-4,6-bis-lower alkylamino-s-triazine and recovering the latter diamino compound from its solution, the amount of reactants added to the reaction medium being equivalent to about one mole of said dichloro compound and about one mole of said amine for each mole of diamino compound being withdrawn from said reaction medium, said reactants being added in order to replace reactants which have been consumed in the reaction, and the acid acceptor being an inorganic alkali acid acceptor in an amount slightly in excess of one mole for each mole of the diamino compound being withdrawn from said reaction medium in order to maintain the pH of said reaction medium, and maintaining the temperature of the reaction medium from about 20° C. to about 90° C.

References Cited

UNITED STATES PATENTS

| | | | |
|---|---|---|---|
| 2,720,480 | 10/1955 | Wolf | 260—249.5X |
| 3,074,946 | 1/1963 | Rattenbury et al. | 260—249.5 |
| 3,198,797 | 8/1965 | Dexter et al. | 260—249.5 |
| 3,244,712 | 4/1966 | Knusli et al. | 260—249.8 |
| 3,245,992 | 4/1966 | Dexter et al. | 260—249.5X |

FOREIGN PATENTS

| | | | |
|---|---|---|---|
| 110,352 | 3/1964 | Czechoslovakia | 260—249.5 |

OTHER REFERENCES

Koopman, "Nieuwe Herbicide 1,3,5 Triazine Derivaten" University of Groningen, The Netherlands (1957) pp. 18–20 and 68–60.

JOHN M. FORD, Primary Examiner

U.S. Cl. X.R.

260—249.8